July 1, 1969  H. B. HINDIN ET AL  3,452,799
VEHICLE TIRES

Filed May 31, 1967  Sheet 1 of 2

INVENTORS
HERBERT B. HINDIN,
ROBERT S. KLANG &
BY  GEORGE M. PHILLIPS

Hamilton & Cook
ATTORNEYS

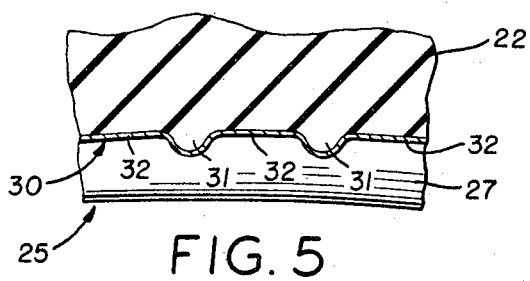
FIG. 5
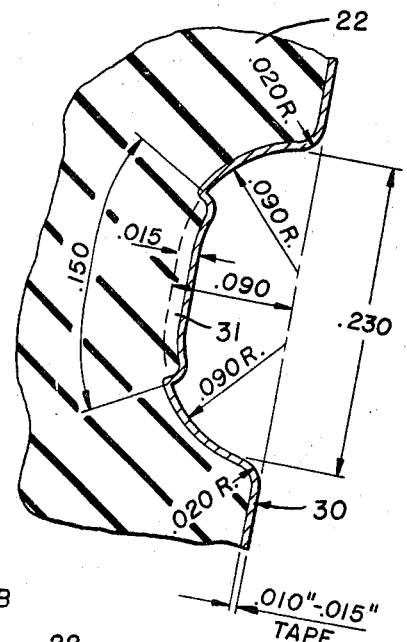
FIG. 6
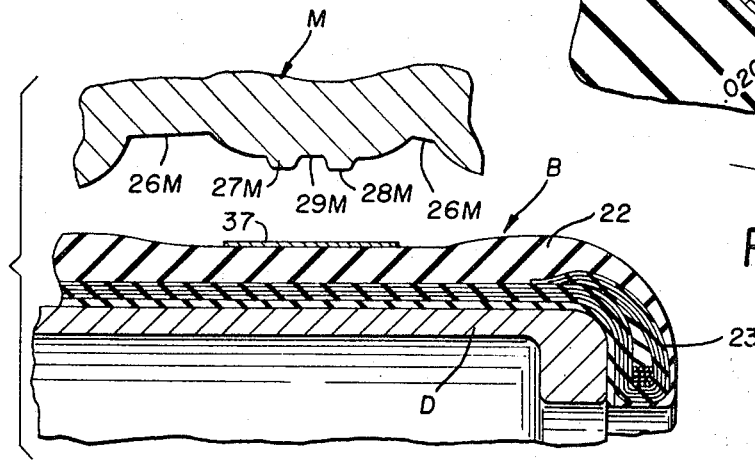
FIG. 7
FIG. 8
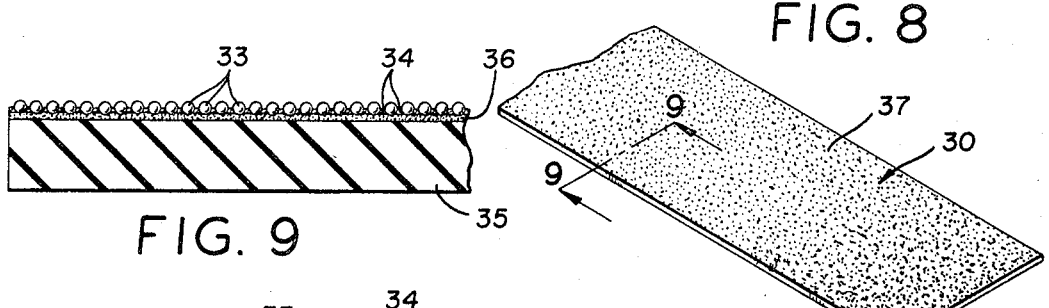
FIG. 9
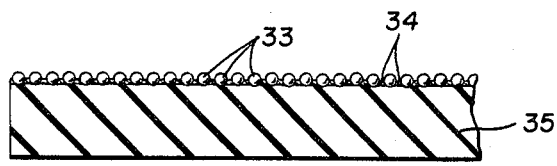
FIG. 10

United States Patent Office 3,452,799
Patented July 1, 1969

1

3,452,799
VEHICLE TIRES
Herbert B. Hindin, Hinsdale, Robert S. Klang, Glen Ellyn, and George M. Phillips, Hoffman Estates, Ill., assignors to The Mohawk Rubber Company, Akron, Ohio, a corporation of Ohio
Filed May 31, 1967, Ser. No. 642,582
Int. Cl. B60c 13/00
U.S. Cl. 152—353                    5 Claims

ABSTRACT OF THE DISCLOSURE

Vehicle tire having light-reflective sidewall. Light beam projected from approaching vehicle reflected from sidewall as a signal image to driver. Sidewall has grooves with inlaid ring of light-reflective material. Each ring has series of faceted surfaces so that shape and character of reflected signal image varies depending upon position of approaching vehicle in relation to position of vehicle ahead.

Background of the invention

Vehicle tires according to the invention were developed to improve upon prior art tires having light-reflective surfaces merely for decoration and ornament. See, for example, the tire of United States Patent No. 3,253,634, granted May 31, 1966. Also, special purpose tires have had heat and/or light reflective sidewall surfaces to improve wearing qualities under extreme conditions.

The sidewalls of the new tires, the tires according to the invention, do present an attractive decorative and ornamental image, in either natural or artificial light. More important, the new tires reflect a signal image providing a heretofore unavailable safety factor for nighttime driving.

To the driver of a vehicle approaching a vehicle equipped with the new tires, the shape and character of the reflected signal image will vary. The overall size of the signal image will increase as the approaching vehicle moves closer. More important, the geometric shape of the signal image is determined by the angle at which the approaching vehicle is moving toward the vehicle ahead.

If the vehicle ahead is broadside, if the approaching vehicle is more or less at right angles, the danger of collision is very great. The reflected signal image will be a wide circle. If the angle of approach is less, as when overtaking and passing a parked or moving vehicle, the reflected signal image will be a narrow ellipse, growing wider as the distance between the vehicles decreases.

Summary of the invention

Therefore, it is an object of the present invention to provide a vehicle tire having a light-reflective surface such that a light beam projected from an approaching vehicle will reflect back from the sidewall and present a signal image to the vehicle driver.

It is a further object to provide a light-reflective sidewall for a tire wherein the signal image to the approaching vehicle driver will vary in shape and character depending upon the position of the approaching vehicle in relation to the position of the vehicle ahead.

These and other objects which will become apparent from the following specification are accomplished by means hereinafter described and claimed.

In general, a vehicle tire according to the invention has on at least one sidewall one or more circumferentially extending grooves with an inlaid light-reflective ring. The light-reflective ring, preferably secured by a vulcanized bond to the tire, comprises a surface of microscopic generally spherical glass beads partially embedded in and adhered to a thin film of light-reflective material

2 carried by a thicker layer of elastomer compatible with the carcass when vulcanized in a curing press or mold.

The invention further contemplates that the circumferentially extending groove or grooves on the tire sidewall are formed with axially directed flutes extending transversely of the groove at spaced intervals so that the inlaid light-reflective ring will have a series of faceted surfaces which are reflective even when the plane of the sidewall is at a very low angle with respect to a projected light beam and which will change the shape and character of a reflected signal image depending upon the angle of incidence of the projected light beam onto the tire sidewall.

The drawings

FIG. 5 is a plan-sectional view taken substantially as indicated on line 5—5 of FIG. 4;

FIG. 6 is an enlarged cross-sectional view showing a circumferentially extending groove with an inlaid light-reflective ring dimensioned for an 8.25-14 size passenger vehicle tire;

FIG. 7 is a schematic cross-sectional view showing an uncured tire band on a building drum and the portion of a curing mold suitable for forming the light-reflective sidewall;

FIG. 8 is a perspective view of a strip of a composite material having a surface of microscopic glass beads partially embedded in and adhered to a thin film of light-reflective material;

FIG. 9 is an enlarged cross-sectional view of the composite strip, taken substantially as indicated on line 9—9 of FIG. 8, showing an intermediate layer of adhesive between the thin film of light-reflective material and a thicker layer of heat-curable elastomer; and FIG. 10 is a view similar to FIG. 9, showing the thin film of light-reflective material adhered directly to the thicker layer of heat-curable elastomer, without the intermediate layer of adhesive.

Description

Figure 1:
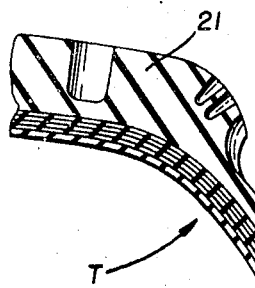
FIG. 1 is a partial cross-sectional view of a cured tire having a light-reflective sidewall according to the invention.

Referring to FIG. 1, a cured pneumatic vehicle tire T, also indicated generally by the numeral 20, comprises a tread portion 21 which integrally merges into axially opposing sidewall portions 22 terminating at radially inner beads portion 23 adapted for mounting on a suitable vehicle rim (not shown). The carcass plies of tire T may be of any conventional construction.

The light-reflective area of the sidewall portion 22 of a tire T is indicated generally by the numeral 25 and is preferably enclosed between heavy circumferentially extending curb bars or ribs 26A and 26B to protect the light-reflective area 25 from mechanical abrasion as when the tire T is driven against a street curb.

Figure 3:
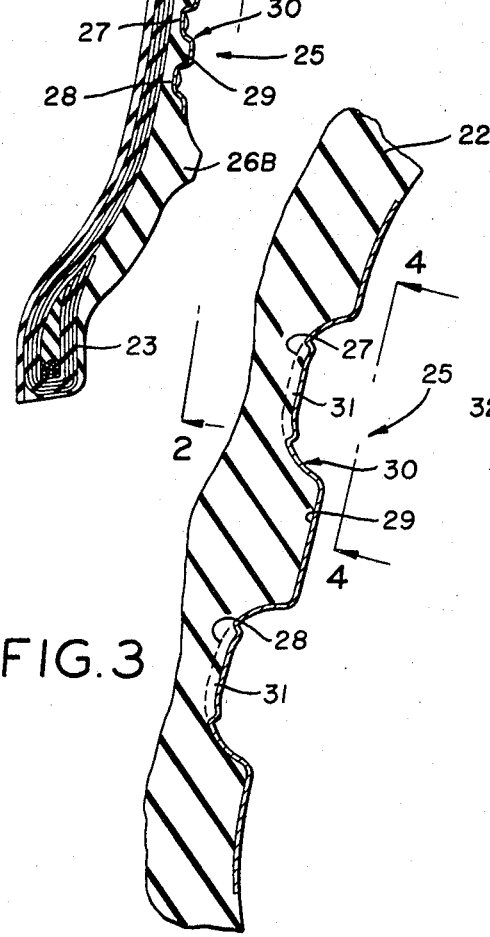
FIG. 3 is an enlarged cross-sectional view of the light-reflective areas of a sidewall according to the invention.

According to the invention, the light-reflective area 25 of a sidewall portion 22 of a tire T must have at least one circumferentially extending groove. As shown, and as best seen in FIG. 3, the embodiment of the invention illustrated has two such grooves; an outer groove 27 and a concentric inner groove 28 separated by an intermediate rib 29.

Also according to the invention, each groove must have an inlaid ring of light-reflective material. As shown, the embodiment of the invention illustrated has an inlaid ring of light-reflective material indicated generally by the numeral 30, in each groove 27 and 28. Further, as shown, the light-reflective material 30 extends radially above the outer groove 27 toward the curb bar 26A, over the intermediate rib 29 and radially below the inner groove 28 toward the curb bar 26B.

Further according to the invention, each sidewall groove 27 and 28 with an inlaid ring of light-reflective material 30 should have the reflective properties thereof enhanced and increased so as to present a reflected signal image through the widest possible range of vision. The driver of an approaching vehicle should be able to see a reflected headlight beam at any place through an arc of substantially 180°. Therefore, each inlaid ring of light-reflective material 30 should have a series of faceted surfaces which vary the proportion of light reflected through an angle of incidence of from ninety degrees down to as low as one to one and a half degrees.

As shown in FIGS. 1–6, each groove 27 and 28 beneath the inlaid rings 30 is formed (during the curing process) with a series of outwardly or axially directed flutes or ribs 31 extending transversely or radially across the axially inner side or base of the grooves. The term "flute" has been chosen to describe the rib elements 31 because of a dictionary definition of a "flute" as being "a rounded groove; specifically, one of the vertical parallel grooves on a classic architectural column." The just quoted definition is also consistent with a dictionary definition of a "fillet" as being "the space between two flutings in a shaft." Referring specifically to FIG. 5, each flute 31 is separated from the adjacent two flutings by a fillet surface 32.

Figure 2:
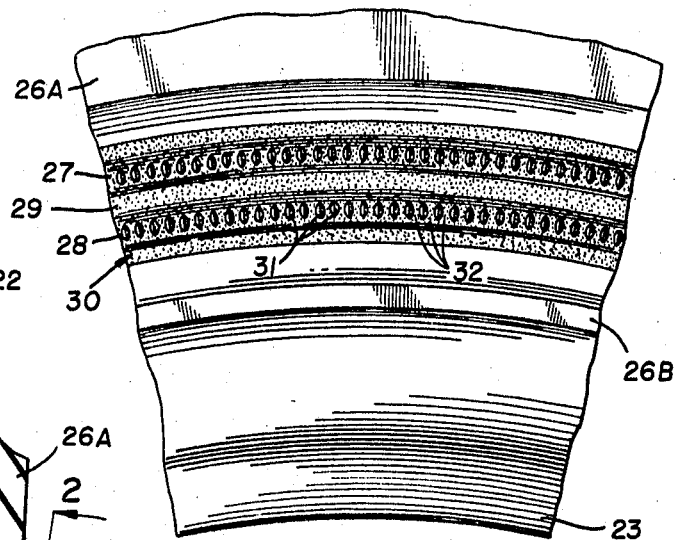
FIG. 2 is a fragmentary side elevational view taken substantially as indicated on line 2—2 of FIG. 1.
Figure 4:
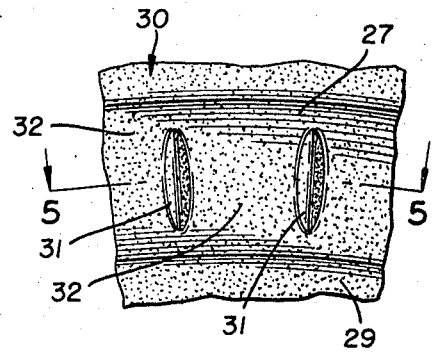
FIG. 4 is an enlarged fragmentary side elevational view taken substantially as indicated on line 4—4 of FIG. 3.

The preferred shape, form or configuration of each flute 31 is illustrated in the several views of the drawings. In FIG. 4, the plan view is that of a flattened ellipse. In FIGS. 3 and 6, the longitudinal sectional view is slightly concave with rounded ends. In FIG. 5, the medial sectional view is round. Referring to FIG. 2, the preferred equal spacing between each flute 31 is approximately one-eighth (⅛) of an inch; for an 8.25–14 size passenger vehicle tire this spacing would result in approximately 472 flutes in each groove 27 or 28. Larger or smaller size passenger tires would have a proportional number of equally spaced flutes 31.

According to the invention, the inlaid ring of light-reflective material 30 comprises a surface of microscopic, very fine or small, generally spherical glass beads partially embedded in and adhered to a thin film of light-reflective material, such as predominantly metallic aluminum, carried by a thicker layer of elastomer, such as a neoprene rubber stock, compatible with the rubber stock forming the sidewall portion 22 of the tire T when vulcanized. Referring to FIGS. 9 and 10, the microscopic glass beads are indicated at 33, the thin film of light-reflective material is indicated at 34, and the layer of elastomer is indicated at 35. Referring to FIG. 9, to increase the resistance of the light-reflective material 30 to mechanical abrasion as from weather conditions, road hazards or tire washing, an intermediate layer of suitable adhesive 36 may be interposed between the film 34 and the elastomer 35. When the elastomer layer 35 is a neoprene the intermediate adhesive layer 36 may be an isocyanate-based adhesive such as described in Skeist, Handbook of Adhesives, Library of Congress Catalog Card Number 62–18033, pages 333–343 (1962).

According to the invention, the sidewall grooves 27 and 28 with the inlaid rings of light-reflective material 30 bonded thereto are preferably formed when an uncured tire band is vulcanized in a curing press or mold. Referring to FIG. 7, an uncured tire band B is built in a conventional manner on a tire building drum D. After the rubber stock for forming the sidewall portion 22 is applied, a strip 37 of the light-reflective material 30 (see FIG. 8) is wrapped completely around the periphery of the band B so that the elastomer layer 35 is in contact with the sidewall stock.

Thereafter, the band B is removed from drum D and conveyed to a curing press (not shown) having a circumferential mold part or segment M for molding the sidewall portion 22 of a tire T under heat and pressure in a conventional manner. Referring still to FIG. 7, the mold M includes surfaces 26M, 27M, 28M and 29M for forming the curb ribs 26A and 26B, the grooves 27 and 28 and the intermediate rib 29 of the tire T.

It will be understood that various changes and modifications could be made, starting with the preferred embodiment of the invention as described above, without departing from the spirit and actual scope of the invention as set forth in the appended claims. For example, the presence of light-reflective material 30 on either side of the grooves 27 and 28 and over the intermediate rib 29 is primarily for decoration and ornament. After the tire T has been vulcanized in a curing press or mold, conventional tire grinding and buffing apparatus could be used to remove selected circumferential areas on axially outer face of the sidewall portion 22, leaving the inlaid ring of material intact in the grooves 27 and/or 28.

We claim:

1. A vehicle tire (T) having axially opposing sidewall portions (22), at least one of said sidewall portions having one or more circumferentially extending grooves (27) with an inlaid ring of light-reflective material (30), characterized in that said sidewall groove (27) beneath said inlaid ring (30) is formed with a series of outwardly directed flutes (31) extending transversely across the axially inner side of said groove.

2. A vehicle tire (T) according to claim 1, further characterized in that each flute (31) is separated from the adjacent two flutings by a fillet surface (32).

3. A vehicle tire (T) according to claim 2, further characterized in that the shape of each flute (31) in a plan view is that of a flattened ellipse, in a longitudinal sectional view is slightly concave with rounded ends, and in a medial sectional view is rounded.

4. An 8.25–14 size passenger vehicle tire (T) according to claim 3, specifically characterized in that there are approximately 472 flutes (31) equally spaced in a groove (27).

5. Any other size passenger vehicle tire (T) having equally spaced flutes (31) proportional to the number of flutes in the tire of claim 4.

References Cited

UNITED STATES PATENTS

| | | | |
|---|---|---|---|
| 957,165 | 5/1910 | Kempshall | 152—353 |
| 2,713,286 | 7/1955 | Taylor | 350—105 |
| 3,253,634 | 5/1966 | De Young | 152—353 |
| 3,382,908 | 5/1968 | Palmquist et al. | 152—353 |

ARTHUR L. LA POINT, *Primary Examiner.*

CHARLES B. LYON, *Assistant Examiner.*

U.S. Cl. X.R.

350—105